US006712505B2

(12) United States Patent
Chapman et al.

(10) Patent No.: US 6,712,505 B2
(45) Date of Patent: *Mar. 30, 2004

(54) WIRELESS REMOTE COOKING THERMOMETER SYSTEM

(75) Inventors: Peter A. Chapman, Avon by the Sea, NJ (US); Chee-Ann Chang, Kwun Tong (HK)

(73) Assignee: Maverick Industries, Inc., Edison, NJ (US)

( * ) Notice: Subject to any disclaimer, the term of this patent is extended or adjusted under 35 U.S.C. 154(b) by 4 days.

This patent is subject to a terminal disclaimer.

(21) Appl. No.: 10/354,565

(22) Filed: Jan. 30, 2003

(65) Prior Publication Data

US 2003/0118077 A1 Jun. 26, 2003

Related U.S. Application Data

(63) Continuation of application No. 09/658,758, filed on Sep. 8, 2000, now Pat. No. 6,568,848.
(60) Provisional application No. 60/155,369, filed on Sep. 20, 1999.

(51) Int. Cl.[7] ............................. G01K 1/02; G08C 19/12
(52) U.S. Cl. .................. 374/155; 374/141; 340/870.17; 99/342
(58) Field of Search ................................. 374/141, 149, 374/179, 155, 208; 340/870.17, 870.04, 870.09, 870.01; 99/342

(56) References Cited

U.S. PATENT DOCUMENTS

| 3,849,622 A | 11/1974 | Merriam |
| 4,089,222 A | 5/1978 | Perkins |
| 4,377,733 A | 3/1983 | Yamaguchi et al. |
| 4,475,024 A | 10/1984 | Tateda |

(List continued on next page.)

FOREIGN PATENT DOCUMENTS

| DE | 3437398 A | 4/1986 |
| JP | 0147025 | 11/1981 |
| JP | 62062130 A | 3/1987 |

OTHER PUBLICATIONS

Kitchenware News & Housewares Review—Jan./Feb. 2002—p. 30.
New York Times, Nov. 22, 2001 Article: A Thermometer That Squawks When the Bird Is Done.
OMEGA Engineering, Inc. Temperature Book, 1989.
Polder Home Tools, 2002.
USDA, Food Safety and Inspection Service Brochure, "Use a Food Thermometer," slightly revised May 2003.

(List continued on next page.)

*Primary Examiner*—Gail Verbitsky
(74) *Attorney, Agent, or Firm*—Lerner, David, Littenberg, Krumholz & Mentlik, LLP

(57) ABSTRACT

A method of remotely monitoring the cooking of meat includes providing a first hand-held unit having a first liquid crystal display and a radio frequency transmitter, providing a temperature sensor in communication with the first unit, the temperature sensor including a substantially rigid temperature probe and a substantially flexible communication line extending, positioning the first unit adjacent a heating compartment, providing a second hand-held unit having a second liquid crystal display and a radio frequency receiver for receiving the temperature readings transmitted by the radio frequency transmitter, selecting a meat for temperature monitoring, selecting a taste preference associated with the selected meat, placing the meat in thermal communication with the heating compartment, inserting the probe into the meat for obtaining temperature readings for the meat, communicating the temperature readings from the probe to the first unit, moving the second unit to a second location spaced from the first unit and transmitting the temperature readings by radio frequency from the first unit to the second unit.

6 Claims, 5 Drawing Sheets

U.S. PATENT DOCUMENTS

| | | | | |
|---|---|---|---|---|
| 4,509,868 A | | 4/1985 | Ronconi et al. | |
| 4,626,662 A | | 12/1986 | Woolf | |
| 4,716,411 A | | 12/1987 | Nakamura | |
| 4,966,125 A | | 10/1990 | Stephen et al. | |
| 4,967,049 A | | 10/1990 | Kaneshiro et al. | |
| 5,364,043 A | | 11/1994 | Linderoth | |
| 5,398,597 A | | 3/1995 | Jones et al. | |
| 5,622,137 A | | 4/1997 | Lupton, Jr. et al. | |
| 5,634,719 A | | 6/1997 | LaNeve | |
| 5,710,409 A | | 1/1998 | Schwarzbacker et al. | |
| 5,727,290 A | * | 3/1998 | Gilbert et al. | |
| 5,746,114 A | | 5/1998 | Harris | |
| 5,780,822 A | | 7/1998 | Lee | |
| 5,837,944 A | | 11/1998 | Herot | |
| D402,212 S | * | 12/1998 | Sirois et al. | D10/57 |
| D402,213 S | * | 12/1998 | Sirois et al. | D10/57 |
| 5,844,862 A | | 12/1998 | Cocatre-Zilgien | |
| 5,911,507 A | | 6/1999 | Jaynes | |
| 5,983,783 A | | 11/1999 | Archard et al. | |
| D418,069 S | * | 12/1999 | Chung et al. | D10/57 |
| 6,000,845 A | | 12/1999 | Tymkewicz et al. | |
| 6,043,461 A | | 3/2000 | Holting et al. | |
| 6,046,674 A | | 4/2000 | Irwin et al. | |
| 6,080,972 A | | 6/2000 | May | |
| 6,121,596 A | | 9/2000 | Taino et al. | |
| 6,142,666 A | | 11/2000 | Koether et al. | |
| 6,238,354 B1 | | 5/2001 | Alvarez | |
| 6,300,871 B1 | | 10/2001 | Irwin et al. | |
| 6,351,217 B1 | * | 2/2002 | Kuhn | |
| 6,384,810 B1 | | 5/2002 | Selker | |
| 2001/0002552 A1 | | 6/2001 | Vinci | |
| 2002/0024512 A1 | | 2/2002 | Terasawa et al. | |

* cited by examiner

WIRELESS REMOTE COOKING THERMOMETER SYSTEM

CROSS REFERENCE TO RELATED APPLICATIONS

The present application is a continuation of U.S. application Ser. No. 09/658,758 filed Sep. 8, 2000, now U.S. Pat. No. 6,568,848, which claims the benefit of U.S. Provisional Application No. 60/155,369 filed Sep. 20, 1999, the disclosures of which is incorporated herein.

BACKGROUND OF THE INVENTION

The present invention generally relates to food preparation and more specifically relates to thermometers used to ensure that food, such as meat, is adequately cooked.

The accurate and reliable measurement of temperatures is particularly important in the food preparation industry. Cooking to exact temperature ranges is critical in gourmet cooking and to avoid undercooking food items. As a result, a number of devices have been developed to accurately measure the temperature of food items being cooked.

U.S. Pat. No. 6,000,845 to Tymkewicz et al. discloses a temperature sensing and indicating device including a housing and an arm that is retractable and extendable into and out of the housing so that the length of the arm can be varied in a predetermined manner. A probe having a temperature sensor therein is enclosed by the arm so that varying the external length of the arm exposes varying lengths of the probe, whereby the exposed length of the probe is inserted into a medium so that the temperature sensor senses the temperature of the medium and converts the temperature sensed into a signal. Using a microprocessor, the signal is conditioned and converted for controlling a visual display that provides a visual indication of the temperature sensed. The visual indication includes a digital numeric display and an analog display.

U.S. Pat. No. 4,089,322 discloses a temperature telemetering device that is typically used with household cooking ranges, ovens, microwave ovens and the like. The device includes a probe having an internal cavity that receives a temperature expansive material such as wax. The cavity is in communication with a displaceable member such as a piston that is responsive to the pressure of the temperature expansive material and is mechanically linked to a latch mechanism that inhibits the operation of a sonic or ultra-sonic signal generator. The assembly is interconnected by adjustment means permitting a variable space between the latch mechanism and the displaceable member, whereby the trigger temperature mechanism can be adjusted.

U.S. Pat. No. 5,983,783 to Archer, discloses an electronic chef's fork which displays indicia such as food type and degree of doneness for a selected food type and temperature, and which includes control areas by which a user selects a meat type. The electronic chef's fork includes operational circuitry that enables a user to select among an array of food type options and to designate a degree of doneness for the selected food types. A prompt message is provided to indicate the degree of doneness attained for the selected food type when the device is inserted into food.

U.S. Pat. No. 4,966,125 discloses a barbecue kettle including a bowl and a cover with the bowl having a food support grid adjacent and an upper rim and a charcoal grid below the food grid along with a cover holder adjacent the rim of the bowl. The cover has a removable thermometer that can sense the internal temperature of the kettle and can also be used as a food thermometer.

U.S. Pat. No. 5,634,719 discloses a food-handling device which a retractable boom mounted temperature probe. The tool has a probe mounted on a manually retractable boom, the probe being extendable over various sites of the food being checked. The boom is pivotally attached to the elongated arm of a spatula and, by a scissor-like action, is raised out of and lowered into the food. The tool is provided with a temperature indicator in the form of a digital readout.

In spite of the above advances, there remains a need for a temperature monitoring system that enables an operator to move away from a cooking location, while maintaining continuous temperature monitoring contact with the cooking location. There is also a need for a temperature monitoring system which is mobile so that the system can be used at a plurality of cooking sites.

SUMMARY OF THE INVENTION

The present invention is a programmable thermometer timer system that ensures that various types of meat such as beef, veal, lamb, pork, chicken, and turkey are adequately cooked in accordance with guidelines established by the U.S.D.A. The system includes a programmable thermometer timer unit having a visual display and keys for entering information into a program stored in the timer structure. The programmable thermometer timer preferably incorporates electronic technology and may have one or more microprocessors for operating one or more temperature control programs.

The system also includes a remote monitoring unit having one or more temperature probes connected thereto. The temperature probes may be inserted into meat being cooked for measuring the internal temperature of the meat. The remote monitoring unit preferably includes a transmission device capable of transmitting temperature readings from the remote unit to the programmable thermometer timer unit. The transmission of the temperature readings from the remote monitoring unit to the timer unit may be made by radio signals, a communication cable, or other methods of transmitting signals from a monitor to a base unit, well known to those skilled in the art.

In operation, a user may select a type of meat to be cooked and a taste preference directed to how well-done the meat should be cooked (i.e. rare, medium rare, medium, well-done, etc.). The user will then enter this information into the programmable thermometer timer unit using entry keys. The particular selection made by the user will be displayed on the display screen of the timer unit. The display screen may be a light-emitting diode display or a liquid crystal display. The display screen may also incorporate other technologies that are able to show the user information entered into the timer unit. The user will then place the remote monitoring unit in the vicinity of the meat being cooked. The user will then insert the one or more temperature measuring probes into the meat. As mentioned above, the remote monitoring unit will continuously measure the internal temperature of the meat and transmit this data to the timer unit, such as by using radio frequency signals or a communications cable connecting the remote unit to the programmable timer unit. The user will then press a start button on the programmable thermometer timer unit to start the monitoring operation. During cooking of the meat, the display screen of the timer unit may continuously display cooking information, such as the type of meat being cooked, the taste preference (i.e., well done), the temperature of the meat and the time remaining until the meat is fully cooked, in accordance with the user's selected taste preferences. The programmable thermometer timer unit may include a clip or fastener so that the unit may be carried on the body of the operator. This feature allows a user to continuously monitor the progress of the cooking operation while engaging in other activities. The timer unit may also include one or more supporting elements for enabling the timer unit to be placed on a support structure, such as a table, and stand in an upright position. The timer unit may also include a noise generating element, such as a beeper, that provides audio signals to a user during critical times of the cooking operation. The timer unit may also include a visual alarm, such as a light-emitting diode.

DETAILED DESCRIPTION OF THE PREFERRED EMBODIMENT

Figure 1:
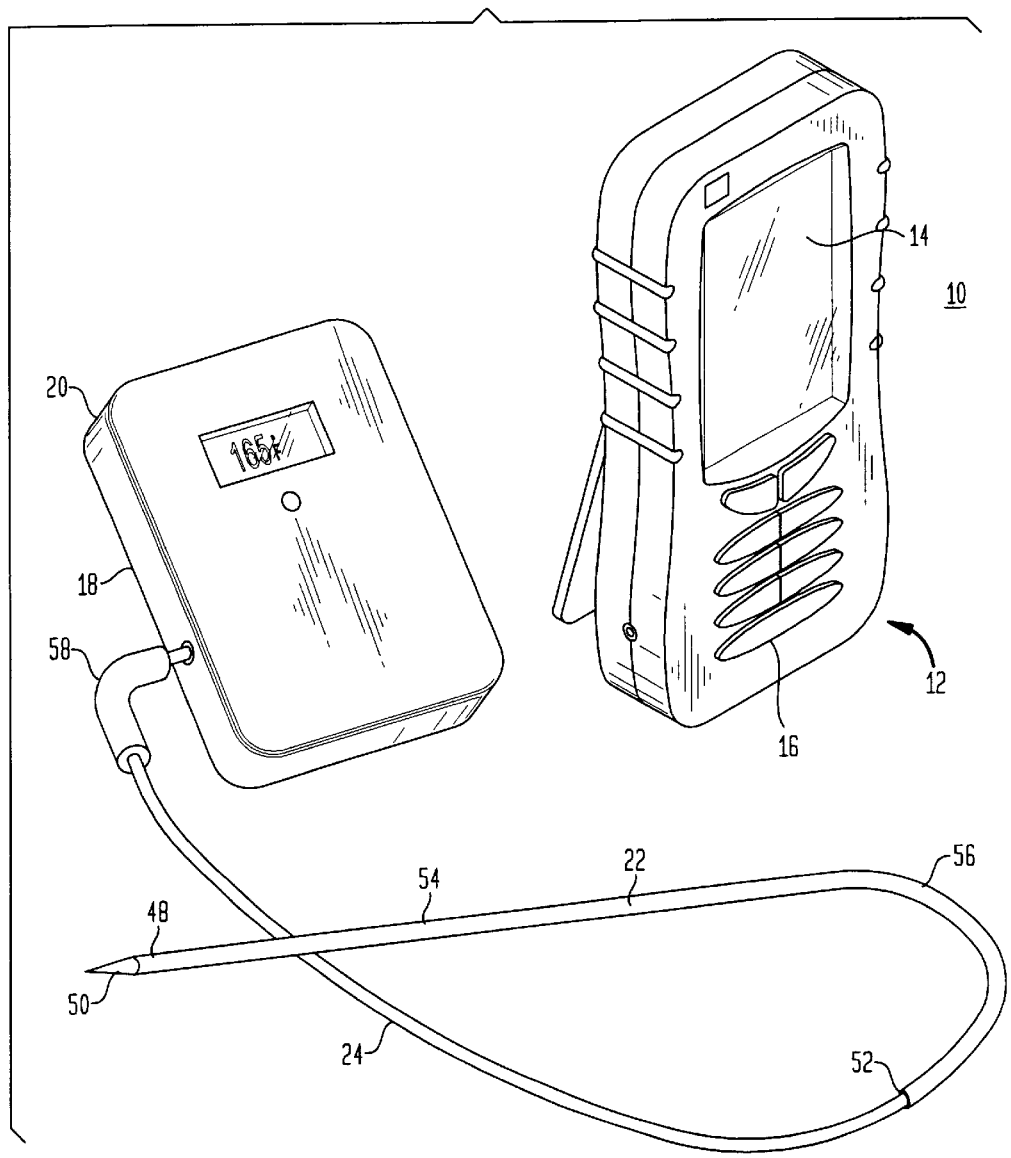
FIG. 1 shows a perspective view of a programmable thermometer timer system in accordance with one preferred embodiment of the present invention.

FIG. 1 shows a perspective view of a programmable thermometer timer system 10, in accordance with certain preferred embodiments of the present invention. The system 10 includes a first unit 18 and a second unit or programmable thermometer timer unit 12, having display screen, 14, and data entry keys 16. The second unit 12 includes one or more microprocessors for operating temperature control programs for cooking meat to preferred temperatures. The data entry keys 16 are used by an operator to enter cooking-related information into the timer unit, such as the type of meat being cooked and taste preferences (i.e., well done).

The system 10 also includes the first unit 18, a remote monitoring and transmitting unit that is capable of monitoring the temperature of the meat being cooked and transmitting the temperature to the second unit 12. The first unit 18 includes a display screen for showing information related to the cooking operation, such as the temperature of the meat. A temperature probe 22 is connected to the remote monitoring first unit. The temperature probe is preferably inserted into the meat being cooked for continuously measuring the internal temperature of the meat. The measured temperature is then carried through communication line 24 to the remote monitoring unit. The first unit may include two or more temperature probes for monitoring the temperatures of various pieces of meat. For example, the first probe may measure the temperature of a piece of chicken and the second probe may monitor the temperature of a steak. The temperatures monitored by the remote or first unit 18 are continuously transmitted to the timer or second unit 12. The temperature data, may be transmitting using radio frequency waves or by a direct communications link between the remote or first unit and the timer or second unit 12. In other preferred embodiments, the temperature probes 22 may be directly connected to the timer or second unit 12, thereby obviating the need for the remote or first unit 18.

Figure 2:
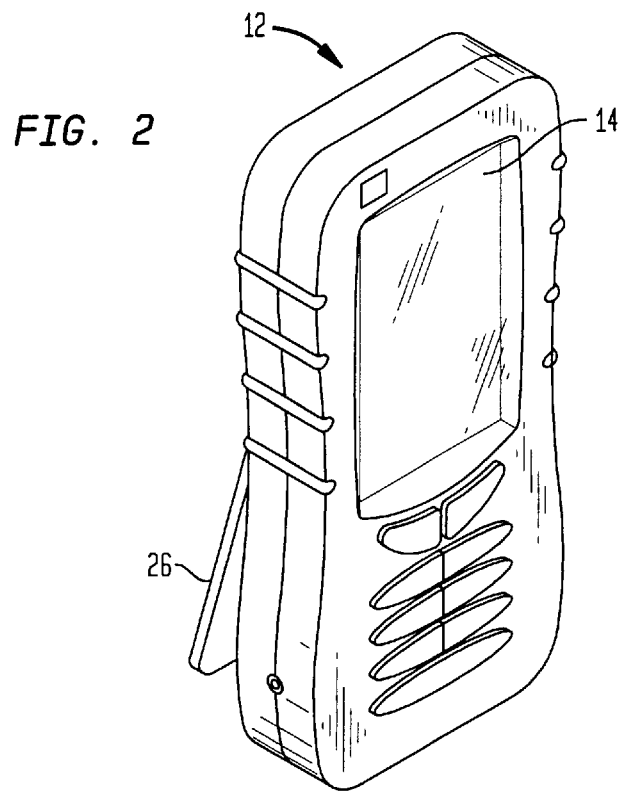
FIG. 2 shows a perspective view of a programmable thermometer timer unit of the system shown in FIG. 1.

FIG. 2 shows a perspective view of the timer or second unit 12, including a supporting device 26 for supporting the timer unit in an upright orientation over a supporting structure, such as a table. The timer or second unit 12 may be powered using electrical power such as direct current, alternating current, or batteries. In highly preferred embodiments, the timer unit is powered using batteries inserted into the unit.

Figure 3:
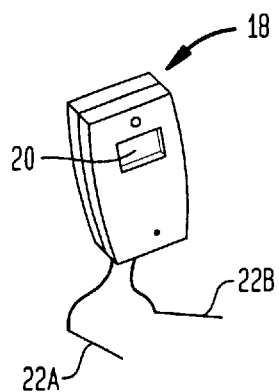
FIG. 3 shows a perspective view of a remote monitoring and transmitting unit shown in FIG. 1.

Referring to FIG. 3, the remote monitoring unit 18 may have a first probe 22A and a second probe 22B connected thereto for monitoring the temperatures of two or more pieces of meat being cooked. The remote monitoring unit 18 also includes a display screen 20.

Figure 4:
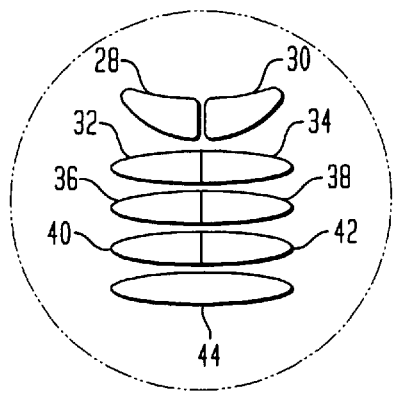
FIG. 4 shows a fragmentary front view of the timer unit shown in FIG. 2, including data entry keys for entering cooking data into the timer unit.

FIG. 4 shows the data entry keys for entering cooking information into the timer or second unit. Key 28 enables the user to display either a clock reading or a timer reading on the display screen 14. Key 30 enables the user to select activation of either temperature probe 22A or temperature probe 22B (FIG. 3). Key 32 enables a user to select the type of meat being cooked, such as beef, veal, or lamb. Key 34 enables a user to select the taste level for cooking the meat (i.e., rare, medium). Keys 36 and 38 enable the user to control the actual temperature to which the meat should be cooked and to change the preferred final cooking temperature of the meat. Key 40 enables the user to set the time in hours on the display screen and Key 40 enables the user to set minutes on the display screen. Finally, Key 44 enables the user to start or stop the timer function of the timer unit.

Figure 5C:
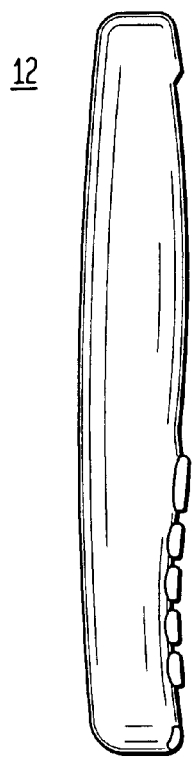
FIGS. 5A, 5B, and 5C show respective front, top, and side views of the programmable thermometer timer unit shown in FIG. 1, in accordance with certain preferred embodiments of the present invention.
Figure 5A:
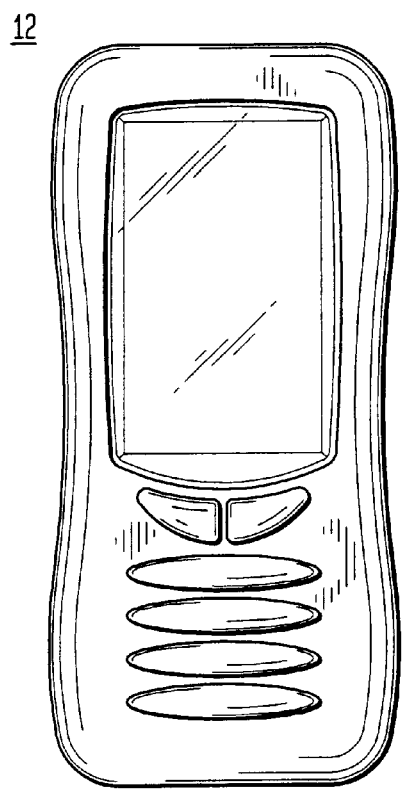
Figure 5B:
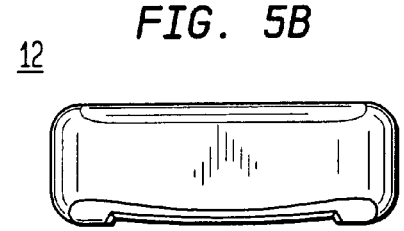

FIGS. 5A–5C show the timer or second unit 12 of FIG. 2. FIG. 5A shows a front view of the timer unit. FIG. 5B shows a top view of the timer unit and FIG. 5C shows a side view of the timer unit 12.

Figure 6C:
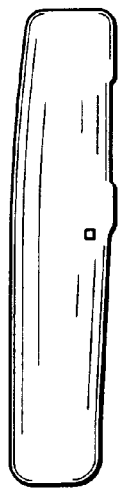
FIGS. 6A, 6B, and 6C show respective front, top, and side views of the remote monitoring and transmitting unit shown in FIG. 1, in accordance with certain preferred embodiments of the present invention.
Figure 6A:
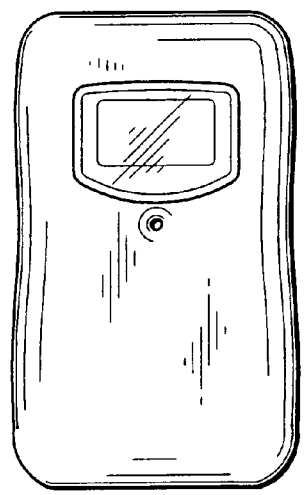
Figure 6B:

FIGS. 6A–6C show the remote monitoring unit or first unit 18 shown in FIG. 3. FIG. 6A shows a front view of the remote monitoring unit 18. FIG. 6B shows a top view of the remote monitoring unit and FIG. 6C shows a side view of the remote monitoring unit.

Referring back to FIG. 1, temperature probe 22 is made of a substantially rigid material such as stainless steel. Temperature probe 22 includes a distal end including a pointed end 50 and a proximal end 52 connected to communication line 24. Communication line 24 is substantially flexible so that temperature probe 22 may be positioned at various orientations relative to first remote unit 18. Substantially rigid temperature probe 22 includes a substantially straight section 54 extending from distal end 48 and a curved section 56 extending between the straight section 54 and proximal end 52 of probe 22. Flexible communication line includes a first end attached to the proximal end 52 of temperature probe 22. Communication line 24 also includes a plug 58 having a male end 60 insertable into a communication jack 62, preferably accessible at an exterior surface of first unit 18. In operation, plug 58 is inserted into jack 62 of first unit 18 so that temperature readings may be transmitted between substantially rigid probe 22 and first unit 18. Preferably, the pointed end 50 at distal end 48 of substantially rigid probe 22 is inserted into a food item such as meat, for temperature monitoring. The substantially straight section 54 of rigid probe 22 may be oriented at a plurality of orientation relative to first unit 18 due to the flexibility of communication line 24.

Figure 7:
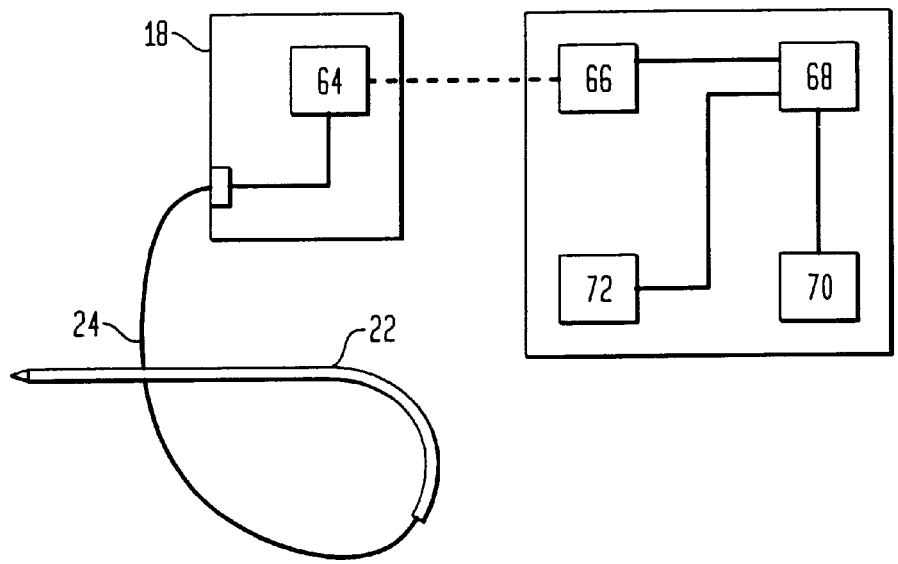
FIG. 7 shows a schematic diagram of the wireless remote cooking thermometer system of the present invention, in accordance with certain preferred embodiments of the present invention.
Figure 8:
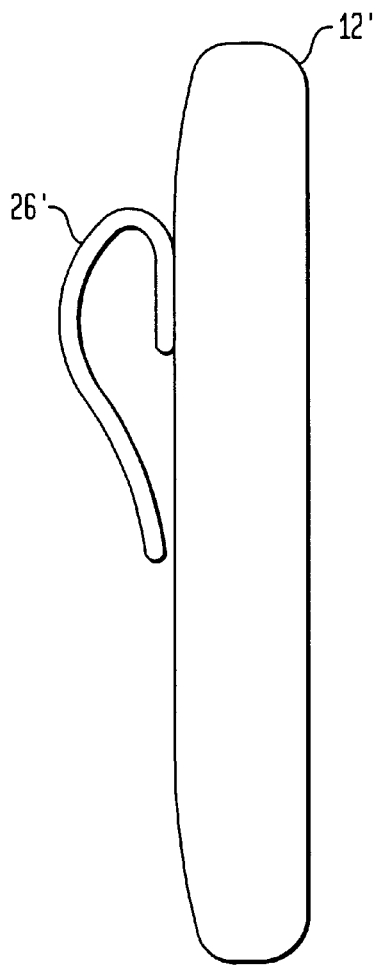
FIG. 8 shows a side view of a programmable timer unit in accordance with certain preferred embodiments of the present invention.

FIG. 7 shows a schematic view of the wireless remote cooking thermometer system of the present invention. First unit 18 includes a radio transmitter 64 for transmitting temperature reading obtained by substantially ridge probe 22. The temperature reading obtained by probe 22 are passed through substantially flexible communication line 24 and onto radio transmitter 64. The temperature signals are then transmitted to second unit 12. Second unit 12 includes a radio receiver 66 that is adapted to receive the temperature readings transmitted by radio transmitter 64. Second unit also includes a microprocessor 68, a timer unit 70 for timing a cooking operation, and a noise-generating unit 72 for generating audible signals.

While there has been described and illustrated embodiments of a wireless remote cooking thermometer system, including a timer unit and a remote monitoring unit, it will be apparent to those skilled in the art that variations and modifications are possible without deviating from the broad spirit and principle of the present invention.

What is claimed is:

1. A method of remotely monitoring the cooking of meat comprising:

providing a first hand-held unit having a radio frequency transmitter;

providing a temperature sensor in communication with said first hand-held unit, said temperature sensor including a substantially rigid temperature probe having a curved section and a substantially flexible communication line extending between said temperature probe and said first hand-held unit;

providing a second hand-held unit having a liquid crystal display, a microprocessor capable of calibrating the meat being cook for taste preferences and a radio frequency receiver for receiving said temperature readings transmitted by said radio frequency transmitter;

positioning said first hand-held unit adjacent a heating compartment;

selecting a meat for temperature monitoring on said provided second hand-held unit;

calibrating a taste preference associated with said selected meat on said provided second hand-held unit;

placing said meat in said hearing compartment;

inserting said probe into said meat for obtaining temperature readings for said meat;

communicating said temperature readings from said probe to said first hand-held unit;

moving said second hand-held unit to a second location spaced from said first hand-held unit;

transmitting said temperature readings by radio frequency from said first hand-held unit to said second hand-held unit.

2. The method as claimed in claim 1, further comprising:

providing a supporting element in contact with said second hand-held unit;

utilizing said supporting element for holding said second hand-held unit in an upright position.

3. The method as claimed in claim 1, further comprising providing a clip on said second hand-held unit for carrying said second unit on a body of an operator.

4. The method as claimed in claim 1, further comprising displaying said transmitted temperature reading, said selected meat and said selected taste preference on said liquid crystal display.

5. The method as claimed in claim 1, further comprising moving said first hand-held unit away from a position adjacent said heating compartment to a second position adjacent a second heating compartment.

6. The method as claimed in claim 1, further comprising generating a noise when said temperature reading reaches a predetermined level.

* * * * *

UNITED STATES PATENT AND TRADEMARK OFFICE
CERTIFICATE OF CORRECTION

PATENT NO. : 6,712,505 B2  Page 1 of 1
DATED : March 30, 2004
INVENTOR(S) : Peter A. Chapman and Chee-Ann Chang It is certified that error appears in the above-identified patent and that said Letters Patent is hereby corrected as shown below:

Column 2,
Line 2, "which" should read -- with --.

Column 5,
Line 11, "are" should read -- is --.
Line 16, insert -- 12 -- after "unit".
Line 20, "has" should read -- have --.
Line 41, "cook" should read -- cooked --.

Signed and Sealed this

Sixth Day of July, 2004

JON W. DUDAS
*Acting Director of the United States Patent and Trademark Office*